United States Patent
Hackl et al.

(10) Patent No.: US 10,723,321 B2
(45) Date of Patent: Jul. 28, 2020

(54) WINDSHIELD WIPER DEVICE HAVING IMPROVED CREEP BEHAVIOR

(71) Applicant: Robert Bosch GmbH, Stuttgart (DE)

(72) Inventors: Viktor Hackl, Sopron (HU); Peter Deak, Budapest (HU); Michael Weiler, Buehl (DE); Attila Geleta, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 906 days.

(21) Appl. No.: 14/917,327

(22) PCT Filed: Aug. 7, 2014

(86) PCT No.: PCT/EP2014/067007
§ 371 (c)(1),
(2) Date: Mar. 8, 2016

(87) PCT Pub. No.: WO2015/032582
PCT Pub. Date: Mar. 12, 2015

(65) Prior Publication Data
US 2016/0221540 A1    Aug. 4, 2016

(30) Foreign Application Priority Data

Sep. 9, 2013   (DE) .................. 10 2013 217 983

(51) Int. Cl.
*B60S 1/38*      (2006.01)
*B29C 71/02*     (2006.01)
(Continued)

(52) U.S. Cl.
CPC .............. *B60S 1/38* (2013.01); *B29C 71/02* (2013.01); *B60S 1/3801* (2013.01); *B60S 1/40* (2013.01);
(Continued)

(58) Field of Classification Search
CPC .. B60S 1/3801; B60S 1/38; B60S 1/40; B60S 2001/3898; B60S 2001/4096; B65D 85/70;
(Continued)

(56) References Cited

U.S. PATENT DOCUMENTS 2,549,144 A * 4/1951 Truscott ................. B29C 35/04
                                                    264/231
3,176,337 A * 4/1965 Glynn ...................... B60S 1/38
                                                    15/250.44
(Continued)

FOREIGN PATENT DOCUMENTS

CN        2200568 Y      6/1995
CN        1376122 A     10/2002
(Continued)

OTHER PUBLICATIONS

International Search Report for Application No. PCT/EP2014/067007 dated Oct. 12, 2014 (English Translation, 3 pages).

*Primary Examiner* — Thanh K Truong
*Assistant Examiner* — Thomas M Wittenschlaeger
(74) *Attorney, Agent, or Firm* — Michael Best & Friedrich LLP

(57) ABSTRACT

The invention relates to a method for reducing material creep processes of a windshield washer device. The method comprises the providing (201) of a windshield washer device for a vehicle. The windshield washer device comprises a wiper blade (2) having an elongated top part (10) and an elongated bottom part (12), which are designed to be at least partially bendable. Furthermore, there is a plurality of connecting elements (18) for connecting the top part and the bottom part, wherein the connecting elements are spaced apart from each other along a longitudinal extension (8) of the wiper blade. The connecting elements (18) are designed to enable a movement of the top part (10) and the bottom (Continued)

part (12) relative to each other, having a movement component along a longitudinal extension (8) of the wiper blade. The method further comprises a loading (202) of the windshield wiper device before final assembly of the windshield wiper device on a vehicle such that, after final assembly of the windshield wiper device, a primary creep behavior of the windshield wiper device is substantially reduced, in particular by at least 80%.

12 Claims, 5 Drawing Sheets

(51) Int. Cl.
   - *B60S 1/40* (2006.01)
   - *B65D 85/00* (2006.01)
   - *B29K 21/00* (2006.01)
   - *B29L 31/30* (2006.01)

(52) U.S. Cl.
   CPC ........ *B65D 85/70* (2013.01); *B29K 2021/003* (2013.01); *B29K 2995/0083* (2013.01); *B29L 2031/305* (2013.01); *B60S 2001/3898* (2013.01); *B60S 2001/4096* (2013.01)

(58) Field of Classification Search
   CPC ........ B29L 2031/305; B29K 2021/003; B29K 2995/0083; B29C 71/02; B29C 71/00; B29C 71/0072; B29C 2071/022; B29C 53/02; B29C 53/84
   See application file for complete search history.

(56) References Cited

U.S. PATENT DOCUMENTS

| | | | | |
|---|---|---|---|---|
| 4,438,543 A | * | 3/1984 | Noguchi | B60S 1/3801 |
| | | | | 15/250.44 |
| 4,985,195 A | * | 1/1991 | Wilson | B29C 51/002 |
| | | | | 264/320 |
| 6,301,742 B1 | * | 10/2001 | Kota | B60S 1/32 |
| | | | | 15/250.361 |
| 7,690,509 B2 | * | 4/2010 | Herring | B60S 1/3848 |
| | | | | 206/461 |
| 7,771,186 B2 | * | 8/2010 | Sakata | B29C 53/083 |
| | | | | 264/340 |
| 9,150,197 B2 | * | 10/2015 | Wang | B60S 1/3801 |
| 2008/0028564 A1 | * | 2/2008 | Ku | B60S 1/38 |
| | | | | 15/250.43 |
| 2008/0073246 A1 | * | 3/2008 | Herring | B60S 1/3848 |
| | | | | 206/776 |
| 2009/0200708 A1 | * | 8/2009 | Sakata | B29C 53/083 |
| | | | | 264/340 |
| 2011/0126373 A1 | * | 6/2011 | Ishida | B60S 1/38 |
| | | | | 15/250.361 |
| 2013/0067679 A1 | * | 3/2013 | Wang | B60S 1/3801 |
| | | | | 15/250.38 |
| 2013/0180073 A1 | * | 7/2013 | Boland | B65D 85/00 |
| | | | | 15/250.32 |
| 2013/0333150 A1 | * | 12/2013 | Crabbe | B60S 1/3855 |
| | | | | 15/250.361 |

FOREIGN PATENT DOCUMENTS

| | | |
|---|---|---|
| DE | 1918917 | 10/1970 |
| DE | 202007005987 | 8/2007 |
| DE | 102010062269 | 6/2012 |
| FR | 2355735 | 1/1978 |
| JP | 0542020 | 6/1993 |

\* cited by examiner

WINDSHIELD WIPER DEVICE HAVING IMPROVED CREEP BEHAVIOR

BACKGROUND OF THE INVENTION

The invention relates to a windshield wiper device for a vehicle, in particular a motor vehicle, and also in particular to a method for reducing material creep processes of a windshield wiper device.

Windshield wiper devices typically have a wiper arm or wiper lever, wherein a wiper blade is moved on the windshield of a motor vehicle. Here, the wiper blade is moved between a first reversal point and a second reversal point. For this purpose, the wiper arm is connected by way of the drive shaft to a wiper motor. In particular on windshields with intense changes in curvature, the wiper blade easily loses contact with the windshield. This can give rise, in particular in the case of intensely curved windshields, to unwiped wiping areas, and/or to smearing.

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. There is therefore a demand for further improving windshield wiper devices.

With regard to the improvement, there is a multiplicity of boundary conditions that must additionally be allowed for. These include the outlay in terms of production or the production costs, the material costs, and also the properties of the windshield wiper device, in particular the function thereof under a variety of conditions, and also the durability under a multiplicity of conditions. In the case of wiper devices for vehicles, it must be taken into consideration here that the cost pressure is ever-increasing and that the vehicles may be used in a multiplicity of climatic conditions, such that, for example, extreme temperature values are encountered on a permanent basis and/or with great fluctuations. Furthermore, the material characteristics such as for example the flexibility and stiffness etc. change over the service life of a windshield wiper device owing to external influences, such that the function of the windshield wiper device is adversely affected.

SUMMARY OF THE INVENTION

It is the object of the present invention to provide a windshield wiper device by means of which at least one or more of the abovementioned disadvantages are reduced or substantially do not arise and/or by means of which reliable, substantially smear-free wiping of a windshield of a vehicle is ensured.

According to one aspect of the present invention, a method for reducing material creep processes of a windshield wiper device is proposed. The method comprises providing a windshield wiper device for a vehicle, in particular a motor vehicle. The windshield wiper device comprises a wiper blade with an elongate upper part and with an elongate lower part, which are designed to be at least partially flexible. Furthermore, multiple connecting elements are provided for connecting the upper part and the lower part, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the method comprises loading the windshield wiper device before final installation of the windshield wiper device on a vehicle, such that, after final installation of the windshield wiper device, a primary creep behavior of the windshield wiper device is substantially reduced, in particular by at least 80%.

According to a further aspect of the present invention, a mold for preloading a windshield wiper device for a vehicle, in particular a motor vehicle, is proposed. Here, the mold is configured so as to preload a windshield wiper device that is placed into the mold with a loading profile along the longitudinal extent of the wiper blade, such that a movement of an upper part of the windshield wiper device and of a lower part of the windshield wiper device relative to one another with a movement component along a longitudinal extent of the wiper blade is effected.

According to a further aspect of the present invention, a windshield wiper device for a vehicle, in particular a motor vehicle, is proposed. The windshield wiper device comprises a wiper blade with an elongate upper part and an elongate lower part, which are designed to be at least partially flexible. Furthermore, multiple connecting elements are provided for connecting the upper part and the lower part, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the connecting elements are connected by way of in each case one first film hinge to the upper part and/or by way of in each case one second film hinge to the lower part, wherein the first film hinge and/or the second film hinge are configured such that a creep of the elongate upper part and/or of the elongate lower part is substantially compensated by way of a creep of the first film hinge and/or of the second film hinge.

Preferred embodiments and particular aspects of the invention will emerge from the dependent claims, from the drawings and from the present description.

According to the embodiments of the method described herein for reducing material creep processes of a windshield wiper device, it is possible for material creep processes of a windshield wiper device, in particular of a fin-ray windshield wiper device, to be reduced in an effective manner. In particular, it is possible for a primary creep behavior after final installation of the windshield wiper device on a vehicle to be reduced in an effective manner.

Furthermore, by means of the embodiments of the mold described herein for preloading a windshield wiper device for a vehicle, a simple and inexpensive tool is provided for reducing, in an effective manner, material creep processes of a windshield wiper device, in particular a primary creep behavior, after final installation of the windshield wiper device on a vehicle.

Furthermore, the embodiments of the windshield wiper device described herein advantageously permit a particularly good adaptation of the windshield wiper device to the curvature of a windshield. Unwiped regions of the windshield, and smearing on the windshield, can be substantially prevented. Furthermore, owing to the structural design of the windshield wiper device described herein, in which the first film hinge and/or second film hinge are configured such that a creep of the elongate upper part and/or of the elongate lower part is substantially compensated by way of a creep of the first film hinge and/or of the second film hinge, a windshield wiper device is provided which exhibits substantially constant material characteristics during its use, such that a high and constant level of wiping quality of the windshield wiper device can be ensured.

In embodiments of the method for reducing material creep processes, which embodiments may be combined with other embodiments, the loading of the windshield wiper device comprises mechanical loading in a loading direction running substantially transversely with respect to the longitudinal extent of the wiper blade, such that a movement of the upper part and of the lower part relative to one another with a movement component along a longitudinal extent of the wiper blade is effected. In this way, material creep processes of a windshield wiper device, in particular a primary creep behavior, after final installation of the windshield wiper device on a vehicle can be reduced in an effective manner.

In embodiments of the method for reducing material creep processes, which embodiments may be combined with other embodiments, the mechanical loading comprises a loading profile along the longitudinal extent of the wiper blade, wherein the loading profile decreases toward one end of the windshield wiper device. It is thus possible for material creep processes of a windshield wiper device along the longitudinal extent of the wiper blade to be reduced, and in particular, the method can be adapted to the configuration of the windshield wiper device through the selection of the loading profile.

In embodiments of the method for reducing material creep processes, which embodiments may be combined with other embodiments, the loading of the windshield wiper device comprises the windshield wiper device being placed into a mold, wherein the mold is configured so as to preload the windshield wiper device. In this way, a simple and inexpensive method for reducing material creep processes of a windshield wiper device is provided.

In embodiments of the method that may be combined with other embodiments, the loading of the windshield wiper device comprises a loading duration of at least 200 hours, in particular at least 300 hours, in particular at least 400 hours. It is thus possible for the method to be adapted to the configuration of the windshield wiper device through the selection of the loading duration.

In embodiments of the method that may be combined with other embodiments, in which the loading of the windshield wiper device comprises the windshield wiper device being placed into a mold in order to preload the windshield wiper device, the mold may be a packaging of the windshield wiper device. In this way, the preloading of the windshield wiper device for the purposes of reducing the primary creep behavior may be performed during the shipping or storage of the windshield wiper devices, such that the preloading requires no extra manufacturing step that would necessitate additional tooling and capacities.

In embodiments of the method that may be combined with other embodiments, the loading of the windshield wiper device comprises thermal loading of the windshield wiper device. It is thus possible for material creep processes of a windshield wiper device, in particular a primary creep behavior, after final installation of the windshield wiper device on a vehicle to be reduced in an effective manner.

In embodiments of the method that may be combined with other embodiments in which thermal loading of the windshield wiper device is performed, the thermal loading comprises a temperature profile with respect to time, in particular an interval temperature profile with respect to time. It is thus possible for the method to be adapted to the configuration of the windshield wiper device through the selection of the temperature profile with respect to time, such that material creep processes are reduced in an effective manner.

In embodiments of the method that may be combined with other embodiments in which thermal loading of the windshield wiper device is performed, the thermal loading comprises a loading duration of at least 10 minutes, in particular at least 20 minutes, in particular at least 30 minutes. It is thus possible for the method to be adapted to the configuration of the windshield wiper device through the selection of the thermal loading duration, such that material creep processes are reduced in an effective manner.

In embodiments of the method that may be combined with other embodiments in which thermal loading of the windshield wiper device is performed, the thermal loading is performed at a temperature which corresponds substantially to a value of 0.1 times to 0.3 times, in particular a value of 0.1 times, in particular of 0.2 times, in particular of 0.3 times, the melting temperature of the material used for the windshield wiper device. It is thus possible for the method to be adapted to the configuration of the windshield wiper device through the selection of the temperature, such that material creep processes are reduced in an effective manner.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1:
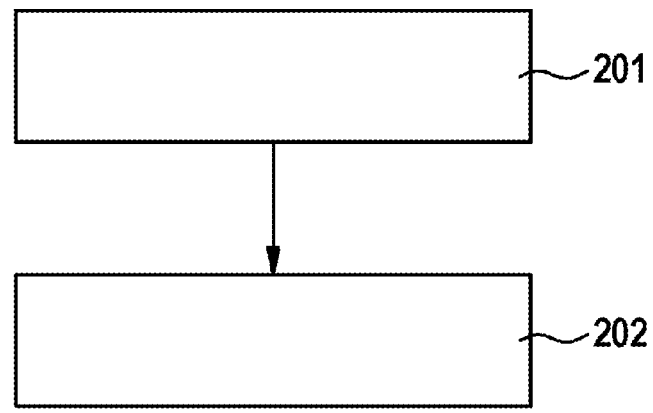
FIG. 1 shows a flow diagram for illustrating embodiments of the method for reducing material creep processes of a windshield wiper device as per embodiments of the disclosure.
Figure 2:
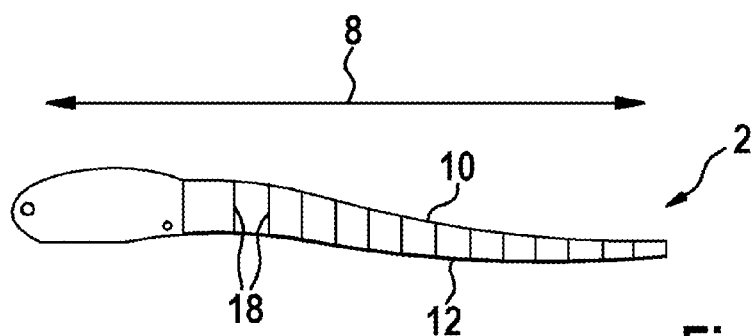
FIG. 2 is a schematic illustration of a wiper blade of a windshield wiper device as per embodiments of the disclosure.

As shown in the flow diagram illustrated in FIG. 1, the method for reducing material creep processes of a windshield wiper device as per embodiments described herein comprises providing 201 a windshield wiper device for a vehicle, in particular a motor vehicle. The windshield wiper device comprises a wiper blade 2 as illustrated by way of example in FIG. 2. The wiper blade 2 typically has an elongate upper part 10 and an elongate lower part 12, which are designed to be at least partially flexible. Furthermore, multiple connecting elements 18 are provided for connecting the upper part 10 and the lower part 12, wherein the connecting elements 18 are spaced apart from one another along a longitudinal extent 8 of the wiper blade. The connecting elements 18 are designed to permit a movement of the upper part 10 and of the lower part 12 relative to one another with a movement component along a longitudinal extent 8 of the wiper blade. Furthermore, the method comprises, as shown by way of example in the flow diagram illustrated in FIG. 1, loading 202 the windshield wiper device before final installation of the windshield wiper device on a vehicle, such that, after final installation of the windshield wiper device, a primary creep behavior of the windshield wiper device is reduced by at least 80%, in particular by at least 90%, in particular by at least 95%.

For explanation of the expression "primary creep behavior" as it is used in the present application, the creep behavior of materials will be briefly described in general terms below. Creep refers to the time-dependent plastic deformation of a material under load. If a component is subjected to load, the strain of the component increases over time in the presence of constant stress. This is illustrated schematically in the creep curves illustrated in FIG. 5.

Upon commencement of the loading, the component reacts with an immediate, time-independent strain which itself is made up of an elastic component in a plastic component. The strain then increases further over the course of time, wherein the strain rate initially changes intensely and usually decreases in continuous fashion. This region of the creep curve is correspondingly referred to as transition creep or primary creep. This region in which the material exhibits primary creep behavior corresponds, in FIG. 5, to the region denoted by the time period $T_1$. This is followed by the region of steady-state or secondary creep, in which the strain rate is approximately constant. The region in which the material exhibits secondary creep behavior corresponds, in FIG. 5, to the region denoted by the time period $T_2$.

In embodiments of the method that may be combined with other embodiments, the loading 202 of the windshield wiper device comprises mechanical loading in a loading direction running substantially transversely with respect to the longitudinal extent 8 of the wiper blade, such that a movement of the upper part 10 and of the lower part relative to one another with a movement component along a longitudinal extent 8 of the wiper blade is effected.

Figure 4:
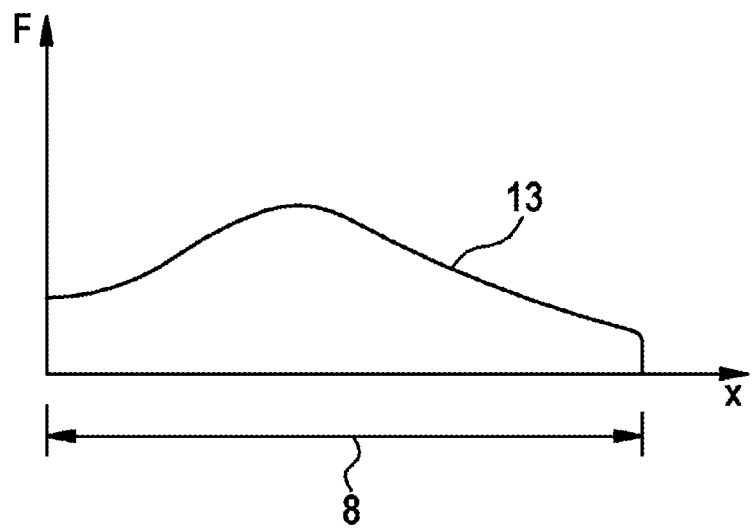
FIG. 4 is a schematic illustration of a loading profile along the longitudinal extent of the wiper blade during a mechanical loading process as per embodiments of the method for reducing material creep processes of a windshield wiper device.

In embodiments of the method that may be combined with other embodiments, the mechanical loading comprises a loading profile 13 along the longitudinal extent 8 of the wiper blade, wherein the loading profile 13 decreases toward one end of the windshield wiper device. FIG. 4 schematically illustrates an exemplary loading profile along the longitudinal extent of the wiper blade.

Figure 3:
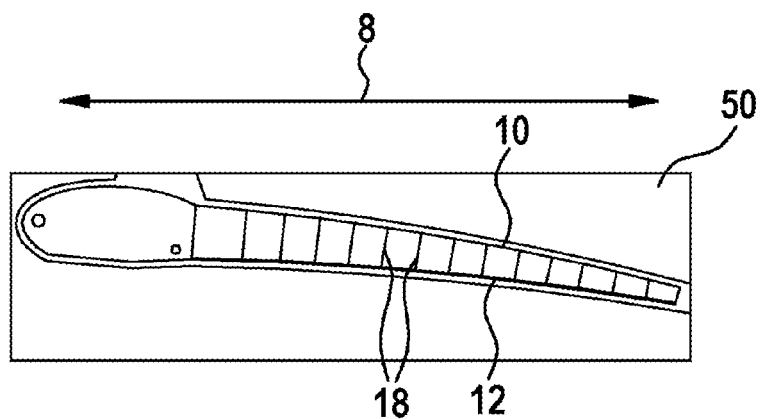
FIG. 3 is a schematic illustration of a mold for preloading a windshield wiper device as per embodiments of the disclosure.

In embodiments of the method that may be combined with other embodiments, the loading 202 of the windshield wiper device comprises the windshield wiper device being placed into a mold 50, such as is illustrated by way of example in FIG. 3. The mold 50 is configured so as to preload the windshield wiper device. In other words, the mold 50 is typically configured such that, after the windshield wiper device is placed into the mold 50, the windshield wiper device is subjected to a mechanical loading in the mold 50.

In typical embodiments, the mold 50 is configured to preload a windshield wiper device that has been placed into the mold with a loading profile 13, such as is illustrated by way of example in FIG. 4, along the longitudinal extent 8 of the wiper blade, such that a movement of an upper part 10 of the windshield wiper device and of a lower part of the windshield wiper device relative to one another with a movement component along a longitudinal extent 8 of the wiper blade is effected. Typically, the direction of action of the loading profile 13 runs substantially transversely with respect to the longitudinal extent 8 of the wiper blade 2.

In embodiments of the method that may be combined with other embodiments, the mold 50 for preloading the windshield wiper device may be a packaging for the windshield wiper device. In this way, the preloading of the windshield wiper device for the purposes of reducing the primary creep behavior may be performed during the shipping or storage of the windshield wiper devices, such that the preloading requires no extra manufacturing step that would necessitate additional tooling and capacities. It is thus possible for the primary creep behavior after final installation of the windshield wiper device such as is described by way of example in the present application to be reduced in a simple and inexpensive manner.

In embodiments of the method that may be combined with other embodiments, the loading 202 of the windshield wiper device comprises a loading of at least 10 MPa, in particular at least 20 MPa, in particular at least 30 MPa.

In embodiments of the method that may be combined with other embodiments, the loading 202 of the windshield wiper device comprises a loading duration of at least 200 hours, in particular at least 300 hours, in particular at least 400 hours.

Figure 5:
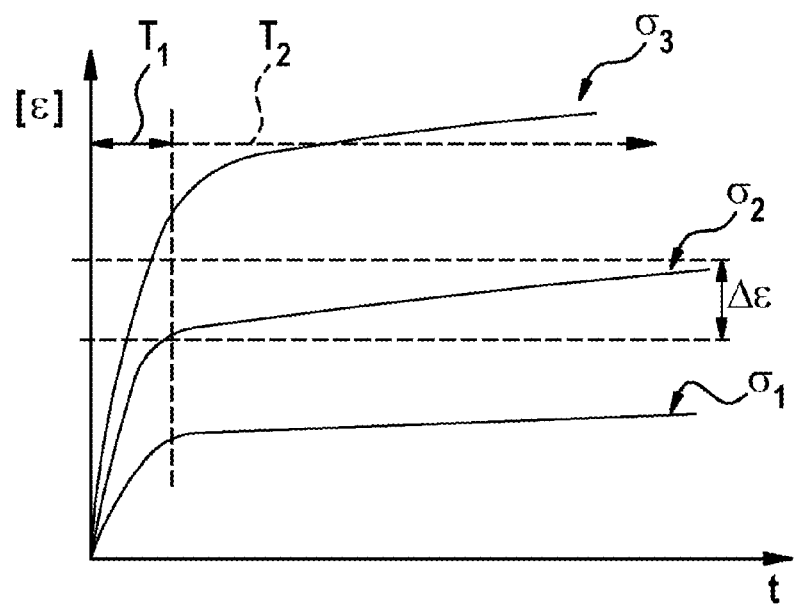
FIG. 5 is a schematic illustration of creep curves for three different constant stresses $\sigma_1$, $\sigma_2$ and $\delta_3$.

FIG. 5 illustrates exemplary creep curves of the windshield wiper device described herein for three different loadings $\sigma_1$, $\sigma_2$ and $\sigma_3$. That region in FIG. 5 which is denoted by $T_1$ represents that time region of the creep curves in which primary creep behavior occurs in the windshield wiper device. The region denoted by $T_2$ represents that time region of the creep curves in which secondary creep behavior occurs in the windshield wiper device. As illustrated in FIG. 5, in the time range of the secondary creep behavior in the creep curves, the strain rate is approximately constant and the change in strain $\Delta\varepsilon$ is relatively low in relation to the change in strain in the time region $T_1$ of the primary creep behavior. In embodiments of the method described herein for reducing material creep processes of a windshield wiper device, the windshield wiper device is, before final installation of the windshield wiper device on a vehicle, loaded such that, after final installation of the windshield wiper device, a primary creep behavior of the windshield wiper device is substantially reduced. In other words, after the final installation of the windshield wiper device on a vehicle, the windshield wiper device as per the embodiments described herein exhibits predominantly secondary creep behavior.

In embodiments of the method that may be combined with other embodiments, the loading 202 of the windshield wiper device may comprise thermal loading of the windshield wiper device. The thermal loading may comprise a temperature profile with respect to time, in particular an interval temperature profile with respect to time.

In embodiments of the method that may be combined with other embodiments, the thermal loading comprises a loading duration of at least 10 minutes, in particular at least 20 minutes, in particular at least 30 minutes. The thermal loading may be performed continuously or at intervals. Typically, the thermal loading is performed at a temperature which corresponds substantially to a value of 0.1 times to 0.3 times, for example a value of 0.1 times, in particular of 0.2 times, in particular of 0.3 times, the melting temperature of the material used for the windshield wiper device.

In typical embodiments of the windshield wiper device that may be combined with other embodiments, the windshield wiper device is produced from one or more materials from a group comprising: PP, PE, POM, PA, TPE (thermoplastic elastomer), for example TPE-S, TPE-O, TPE-U, TPE-A, TPE-V and TPE-E.

Below, an exemplary windshield wiper device will be described, for which the method described herein for reducing material creep processes is particularly advantageous. In principle, the method described herein may however also be used for other windshield wiper devices.

Figure 6A:
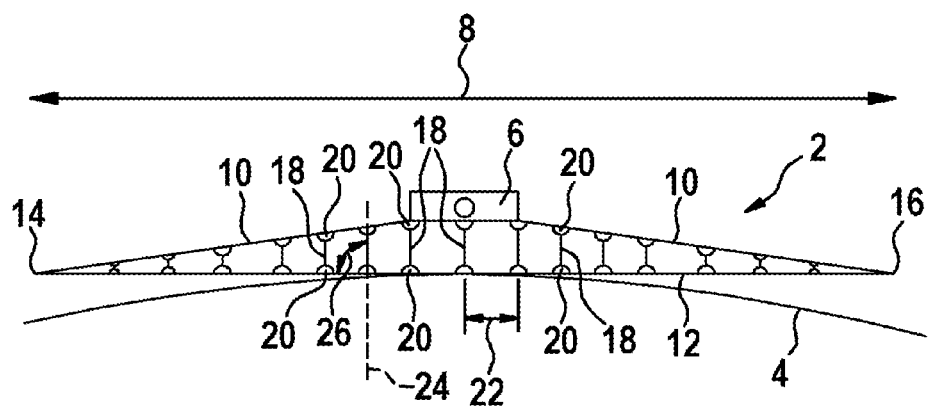
FIG. 6A is a schematic illustration of a wiper blade of a windshield wiper device as per embodiments of the disclosure, in a basic position.
Figure 6B:
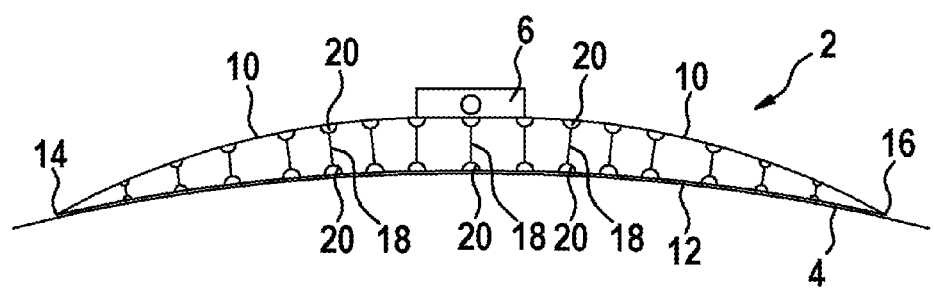
FIG. 6B is a schematic illustration of the wiper blade of a windshield wiper device as per embodiments of the disclosure according to FIG. 6A in a position placed against a windshield.

FIGS. 6A and 6B are schematic illustrations of a wiper blade 2 in a basic position (FIG. 6A) and in a position placed against a windshield (FIG. 6B) as per embodiments of the windshield wiper device of the disclosure. The wiper blade 2 serves for wiping a windshield 4 of a vehicle, which is for example a motor vehicle, in particular an automobile. Normally, the wiper blade 2 is attached to a windshield wiper arm which, for the wiping action, is driven by way of a motor. For this purpose, the wiper blade 2 has a bracket 6 by which it can be fastened to the windshield wiper arm. The wiper blade 2 is, in FIG. 6A, situated in a basic position in which it is at least partially raised from the windshield 4. The wiper blade 2 has an elongate extent 8 and has an elongate upper part 10 and a likewise elongate lower part 12. The longitudinal extents of the upper part 10 and of the lower part 12 correspond substantially to the longitudinal extent 8 of the wiper blade 2.

Both the upper part 10 and the lower part 12 are, or may be designed as, flexible beams which, in FIGS. 6A and 6B are for example in each case of unipartite form. This makes it possible to realize a particularly stable construction. It is likewise possible for only in each case one part of the upper part 10 and/or of the lower part 12 to be designed to be flexible. Furthermore, it is alternatively possible for the upper part 10 to be formed in two parts, wherein then, in each case one end of the two parts of the two-part upper part 10 is fastened to the bracket 6.

In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum bending stiffness is thus realized. The upper part 10 and the lower part 12 are arranged so as to be situated opposite one another. Both ends of the upper part 10 are fixedly connected, at outer connecting positions 14 and 16, to in each case one end of the lower part 12. Otherwise, the upper part 10 and the lower part 12 are spaced apart from one another.

The upper part 10 and the lower part 12 are connected to one another by connecting elements 18. In particular in the basic position of the wiper blade 2, said connecting elements run approximately transversely to the longitudinal extent 8 of the wiper blade 2. The connecting elements 18 are fastened by way of rotary joints 20 to inner longitudinal sides, which face toward one another, of the upper part 10 and of the lower part 12. The rotary joints 20 are in this case hinges. In particular, the rotary joints 20 may be in the form of film hinges. This is advantageous in particular if upper part 10, lower part 12 and/or connecting elements 18 are produced from a plastics material or are coated with a suitable plastics material.

In typical embodiments which are described here and which may be combined with other embodiments described here, a rotary joint is selected from the group comprising: a hinge, a film hinge, a narrowing of the material for the purposes of generating a relatively low stiffness along a torsion axis, a joint with an axis of rotation, and a means for connecting the upper part to the connecting element or for connecting the lower part to the connecting element, which means permits the displacement of the lower part relative to the upper part along the longitudinal extent, etc.

Embodiments in which the joint is provided by way of a film hinge thus make it possible to provide the joints for a fin-ray wiper in a very simple manner. The wiper blade 2 may be provided in unipartite, in particular ready-from-the-mold form. In typical embodiments, the film hinges exhibit a high level of extensibility. This may be realized for example by way of a material selected from the group PP, PE, POM and PA. Alternatively, the film hinges may be produced from one or more materials from a group comprising: TPE (thermoplastic elastomer), for example TPE-S, TPE-O, TPE-U, TPE-A, TPE-V and TPE-E.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In this way, it is possible to ensure a particularly high level of flexibility of the windshield wiper device, in particular of its lower part, and good adaptation to the curvature and changes in curvature of the windshield to be wiped.

In FIG. 6A, one spacing 22 is illustrated as a representative of the spacings between in each case two connecting elements 18. The connecting elements 18 are, in particular in the basic position of the wiper blade 2, fastened to the lower part 12 such that their longitudinal axes run at angles 26 of between 65° and 115°, in particular between 75° and 105°, with respect to the lower part 12. The angles particularly advantageously lie between 80° and 100°. This advantageously ensures that a force acting on the lower part is transmitted in a particularly effective manner to the upper part. Furthermore, in this way, it is possible to realize a particularly stable windshield wiper device. This applies correspondingly to the fastenings of the connecting elements 18 to the upper part 10.

In FIG. 6A, one longitudinal axis 24 is illustrated as an example of the longitudinal axes of the connecting elements 18, and one angle 26 is illustrated as an example of the angles between the connecting elements 18 and the lower part 12. The spacings between the upper part 10 and the lower part 12 are defined primarily by the lengths of the connecting elements 18. The lengths of the connecting elements 18 increase in size proceeding from the two outer connecting positions 14, 16 as far as approximately the locations at which the bracket 6 that is attached to the upper part 10 begins. In this way, in the side view of the wiper blade 2 as per FIG. 6A, the upper part 10 and lower part 12 form a double wedge, wherein the tips of the two wedges point in opposite directions. The connecting elements 18 are designed to be resistant to buckling.

FIG. 6B is a schematic illustration of the wiper blade 2 as per FIG. 6A in a position placed against the windshield 4. Since the windshield 4 has a curvature, it is the case that, when the wiper blade 2 bears against the windshield 4, contact pressure forces act on the lower part 12. Since the upper part 10 and the lower part 12 are flexible beams and the connecting elements 18 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the windshield 4.

Owing to the construction of the embodiments described here, it is the case that, when a force is exerted on the lower part (by the windshield 4), the lower part bends in the direction from which the force acts. This is realized by way of the connection of the upper part 10 and of the lower part at connecting position 14 and/or 16, the shape, and by way of rotary joints at the connection between the connecting elements and the upper part and lower part.

In the illustration as per FIG. 6B, there is a small spacing between the wiper blade 2 and the windshield 4, which spacing serves here merely for the illustration of the windshield 4 and of the wiper blade 2 and, in reality, substantially does not exist when the wiper blade 2 bears against the windshield 4. Furthermore, a wiper lip is typically provided on the lower side, averted from the upper part 10, of the lower part 12, which wiper lip is set down on the windshield 4 for wiping purposes. For the sake of clarity, the wiper lip is not illustrated in FIGS. 6A and 6B.

A windshield wiper device as per embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a windshield wiper device as per the embodiments described herein has the advantage of improved adaptation to a windshield of a motor vehicle. In the case of a conventional windshield wiper blade, the upper part thereof is conventionally rigid, that is to say is not designed to be flexible.

FIGS. 6A and 6B show a wiper blade 2 with a longitudinal extent 8 extending substantially between the connecting positions 14 and 16. Such an arrangement is commonly used for front windshield wipers. Alternatively, however, the windshield wiper device may also have only one connecting position which, in analogy to FIGS. 6A and 6B, corresponds to a halving of the windshield wiper device, and wherein, for example, an axis of rotation is provided at a position of the bracket 6. Such an arrangement is commonly used for rear windshield wipers. This is illustrated by way of example inter alia in FIGS. 7A and 7B. Optional refinements and details such as are described in individual embodiments may be used generally for both variants of an arrangement of a windshield wiper device.

Figure 7A:
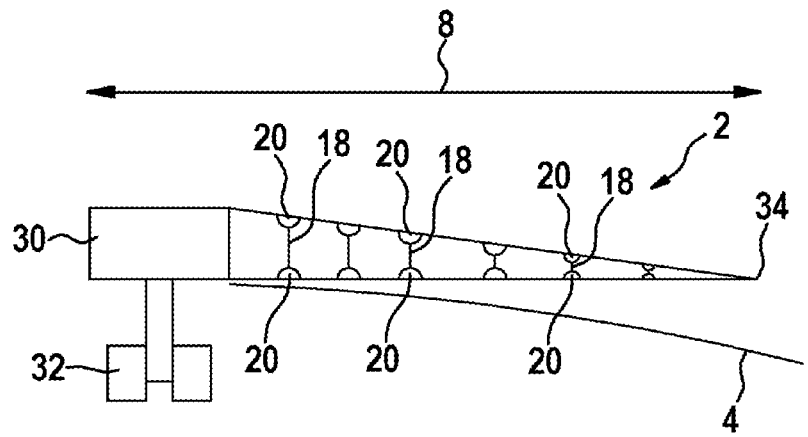
FIG. 7A is a schematic illustration of a further exemplary embodiment of a windshield wiper device according to the invention, in the form of a wiper arm with integrated wiper blade, in a basic position.

FIG. 7A is a schematic illustration of a further exemplary embodiment of the windshield wiper device according to the invention in the basic position. Here, the windshield wiper device is a wiper arm with an integrated wiper blade 2 which is attached to a fastening part 30. The fastening part 30 is connected to a wiper motor 32 which drives the fastening part 30 in order to wipe the windshield 4. The wiper blade 2 is of wedge-shaped design, wherein one end of the upper part 10 is fixedly connected at an outer connecting position 34 to one end of the lower part 12. The respective other ends of the upper part 10 and of the lower part 12 are fastened to the fastening part 30. With regard to the basic construction and in particular the fastenings of the connecting elements 18, the windshield wiper device as per FIG. 7A corresponds in principle to that as per FIG. 6A.

Figure 7B:
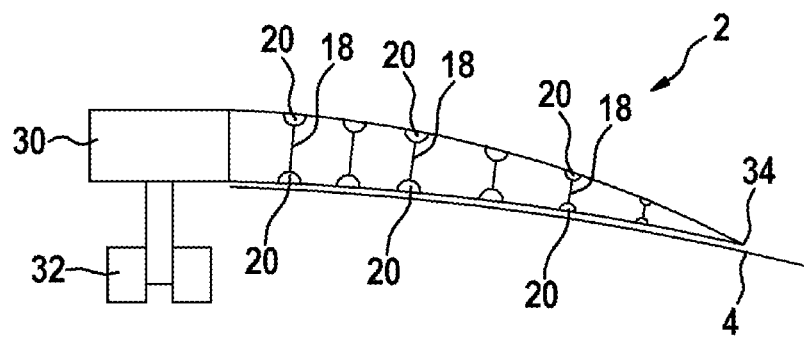
FIG. 7B is a schematic illustration of the wiper arm with integrated wiper blade according to FIG. 7A in a position placed against a windshield.

FIG. 7B is a schematic illustration of the wiper blade 2 with integrated wiper arm 30 as per FIG. 6B in a position placed against the windshield 4. In this case, too, pressure forces act on the lower part 12 of the wiper blade 2 from below from the direction of the windshield 4, such that the lower part 12 and the upper part 10 bend in the direction of the windshield 4.

Both in FIG. 6A and in FIG. 7A, the wiper blade is illustrated in its position in which it has not been placed against the windshield, such that the lower part 12 is of substantially straight form. According to yet further embodiments that may be combined with other embodiments, the lower part is, in the unloaded state, of convex form, that is to say with a curvature which projects away from the upper part in a central region. Upon coming into contact with a windshield, the windshield wiper device as per the embodiments described here can typically then, proceeding from the convex shape of the lower part, assume the corresponding concave shape of the lower part adapted to the windshield.

Figure 8:
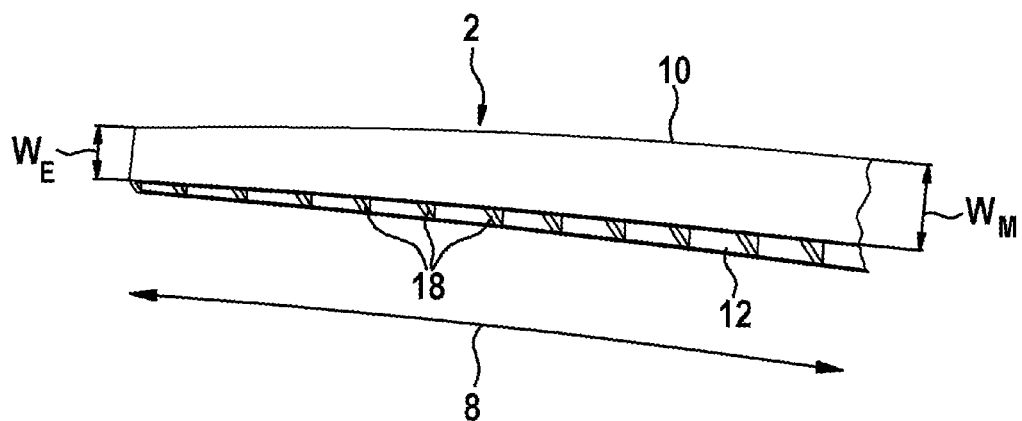
FIG. 8 is a schematic perspective illustration of a wiper arm of a windshield wiper device as per embodiments of the disclosure.

FIG. 8 is a schematic perspective illustration of a wiper blade 2 of a windshield wiper device as per embodiments of the disclosure. As illustrated in FIG. 8, the wiper blade 2 has, at the outer connecting positions at which the ends of the elongate upper part 10 and of the lower part 12 are connected to one another, an outer width $W_E$. In typical embodiments, the outer width $W_E$ is at least 15 mm, in particular at least 20 mm, in particular at least 25 mm.

In embodiments of the disclosure that may be combined with other embodiments, the width of the wiper blade 2 increases from the outer connecting positions in the direction of the fastening part 30 or of the bracket 6, by which the wiper blade can be fastened to the windshield wiper arm. In FIG. 8, by way of example, an inner width is denoted by $W_M$. In typical embodiments, the inner width $W_M$ is at least 20 mm, in particular at least 25 mm, in particular at least 30 mm.

Figure 9A:
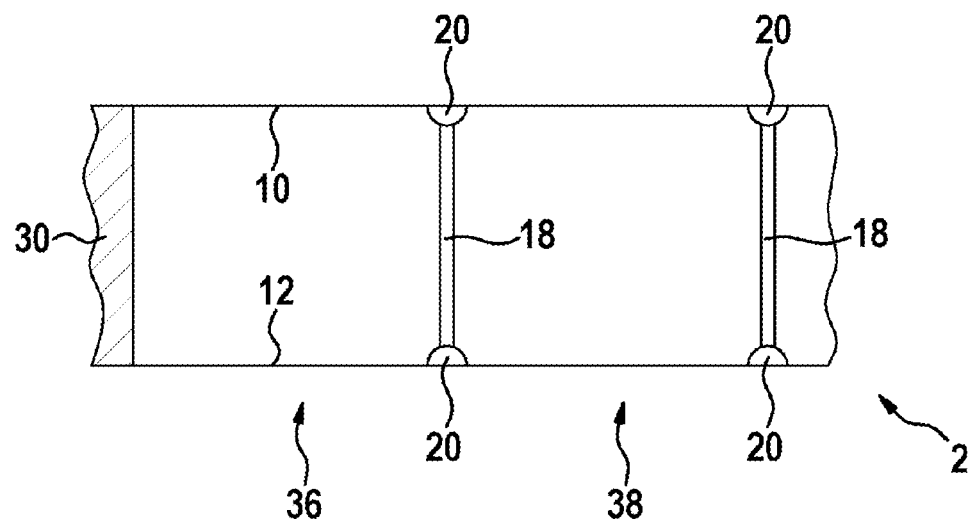
FIG. 9A is a schematic illustration of a detail of the wiper blade according to FIG. 7A.

FIG. 9A is a schematic illustration of a detail of the wiper blade 2 as per the exemplary embodiment as per FIG. 7A, in which the wiper blade 2 is situated in the basic position. The illustration shows the left-hand end region of the wiper blade 2, in which one end of the upper part 10 and one end of the lower part 12 are fastened to the fastening part 30. FIG. 9A shows, proceeding from the transition from the fastening part 30 to the wiper blade 2, the first two connecting elements 18, which delimit two wiper blade elements 36 and 38. The connecting elements 18 are fastened to the upper part 10 and to the lower part 12 by way of rotary joints 20.

Figure 9B:
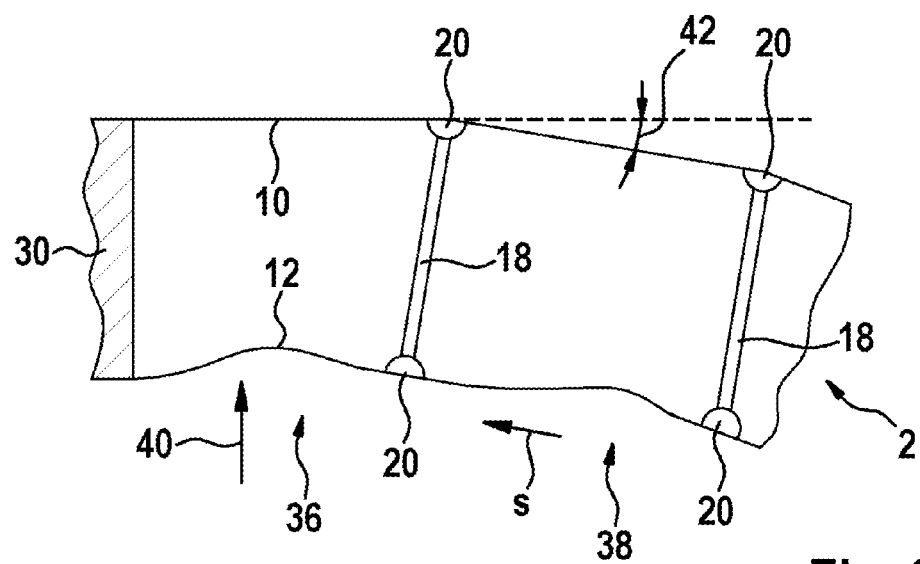
FIG. 9B is a schematic illustration of a detail of the wiper blade according to FIG. 7B.

FIG. 9B is a schematic illustration of a detail of the wiper blade 2 as per the exemplary embodiment as per FIG. 7B, in which the wiper blade 2 is placed against the windshield 4. Pressure forces act on the lower part 12 from below from the direction of the windshield. In FIG. 9B, one pressure force 40 is illustrated as a representative of the pressure forces. The pressure force 40 causes an arching and bending of the lower part 12 of the wiper blade element 36. As a result, the rotary joint 20 of the first connecting element 18 is displaced to the left by a distance s. The second wiper blade element 38 bends downward in the direction from which the pressure force 40 originates, and bears closely against the windshield. Here, an angle 42 forms between the first wiper blade element 36 and the second wiper blade element 38. Furthermore, a further pressure force is generated which then acts on the lower part 12 of the second wiper blade element 38 and which prevents further downward bending of the second wiper blade element 38. A chain reaction to the wiper blade element situated adjacently to the right occurs as far as the end of the wiper blade 2.

According to a further aspect of the present invention, the windshield wiper device as described by way of example in conjunction with FIGS. 6A to 9B is configured such that creep of the elongate upper part 10 and/or of the elongate lower part 12 is substantially compensated by creep of the film hinges.

According to the method described herein, it is possible for material creep processes of a windshield wiper device, in particular of a fin-ray windshield wiper device, in particular a primary creep behavior, after final installation of the windshield wiper device on a vehicle to be effectively reduced. It is thus possible for a windshield wiper device to be provided which exhibits substantially constant material characteristics during its use, such that a high and constant level of wiping quality of the windshield wiper device can be ensured.

What is claimed is:

1. A method for reducing material creep processes of a windshield wiper device, comprising:
   providing (201) a windshield wiper device for a vehicle, comprising a wiper blade (2) with an elongate upper part (10) which is configured to be at least partially flexible, an elongate lower part (12) which is configured to be at least partially flexible, and multiple connecting elements (18) connecting the upper part (10) and the lower part (12), wherein the connecting elements (18) are spaced apart from one another along a longitudinal extent (8) of the wiper blade, and wherein the connecting elements (18) are configured to permit a movement of the upper part (10) and of the lower part relative to one another with a movement component along the longitudinal extent (8) of the wiper blade,
   loading (202) the windshield wiper device before final installation of the windshield wiper device on a vehicle, such that, after final installation of the windshield wiper device, a primary creep behavior of the windshield wiper device is substantially reduced, wherein the loading (202) of the windshield wiper device comprises the windshield wiper device being placed into a mold (50), wherein the mold is configured to preload the windshield wiper device to reduce the primary creep behavior of the windshield wiper device during at least one of shipping or storage of the windshield wiper device in the mold, and wherein the mold is a windshield wiper shipping container sized and shaped for the windshield wiper device.

2. The method as claimed in claim 1, wherein the loading (202) of the windshield wiper device comprises mechanical loading in a loading direction running substantially transversely with respect to the longitudinal extent (8) of the wiper blade, such that a movement of the upper part (10) and of the lower part relative to one another with a movement component along a longitudinal extent (8) of the wiper blade is effected.

3. The method as claimed in claim 2, wherein the mechanical loading comprises a loading profile (13) along the longitudinal extent (8) of the wiper blade, wherein the loading profile (13) decreases toward one end of the windshield wiper device.

4. The method as claimed in claim 1, wherein the loading (202) comprises a loading duration of at least 200 hours.

5. The method as claimed in claim 1, wherein the loading (202) comprises a loading duration of at least 300 hours.

6. The method as claimed in claim 1, wherein the loading (202) comprises a loading duration of at least 400 hours.

7. The method as claimed in claim 1, wherein the wiper device is configured to act via a fin-ray principle, wherein the upper part (10) and the lower part (12) each extend substantially an entire length of the wiper device along the longitudinal extent (8), and wherein the connecting elements (18) are spaced apart from one another along substantially the entire length of the wiper device.

8. The method as claimed in claim 1, wherein each of the connecting elements (18) is connected by way of one first film hinge (20) to the upper part (10) and by way of one second film hinge (20) to the lower part (12), and wherein the first film hinge (21) and the second film hinge are each configured such that a creep of the elongate upper part (10) and of the elongate lower part (12) is substantially compensated by way of a creep of the first film hinge and of the second film hinge.

9. The method as claimed in claim 1, wherein the upper part and the connecting elements each comprise plastic.

10. The method as claimed in claim 1, wherein the primary creep behavior of the windshield wiper is reduced by at least 80%.

11. The method as claimed in claim 1, further comprising shipping the windshield wiper shipping container with the windshield wiper device disposed therein, and reducing the primary creep behavior during the shipping.

12. The method as claimed in claim 11, further comprising storing the windshield wiper shipping container with the windshield wiper device disposed therein, and reducing the primary creep behavior during the storing.

* * * * *